T. J. GIBBONS.
HARROW TOOTH.
APPLICATION FILED AUG. 11, 1913.
1,091,831.
Patented Mar. 31, 1914.
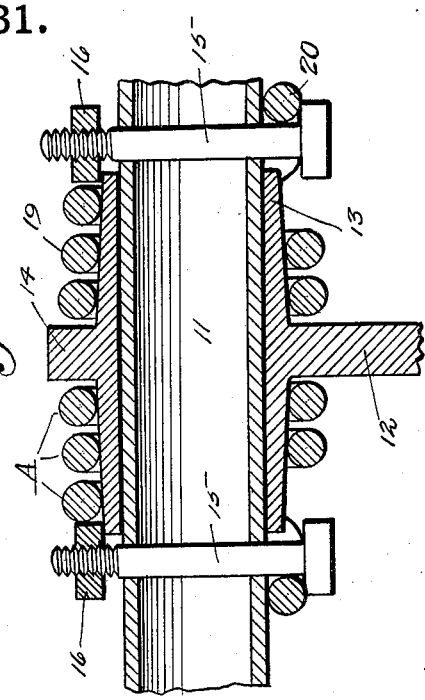
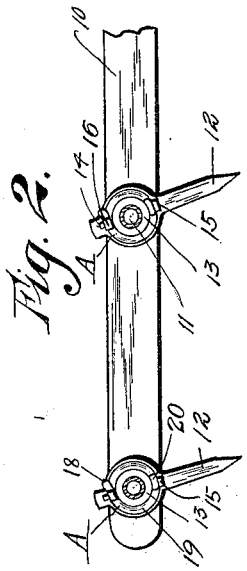
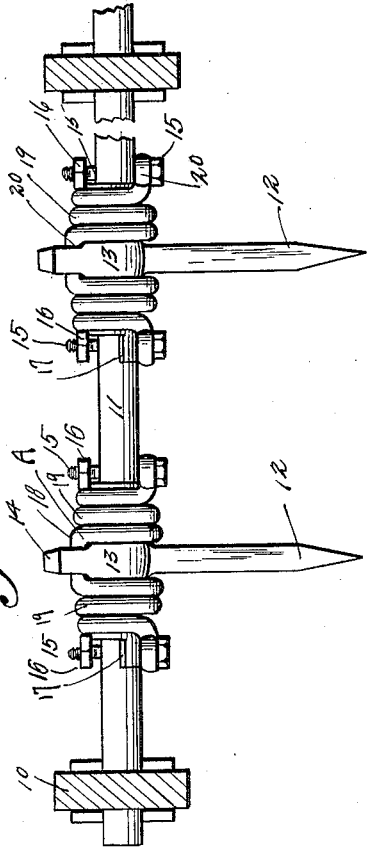
Witnesses:
Inventor:
Thomas J. Gibbons
Attorneys.

UNITED STATES PATENT OFFICE.

THOMAS J. GIBBONS, OF PLATTE, SOUTH DAKOTA.

HARROW-TOOTH.

1,091,831.  Specification of Letters Patent.  Patented Mar. 31, 1914.

Application filed August 11, 1913. Serial No. 784,428.

*To all whom it may concern:*

Be it known that I, THOMAS J. GIBBONS, a citizen of the United States, residing at Platte, in the county of Charles Mix and State of South Dakota, have invented a certain new and useful Harrow-Tooth, of which the following is a specification.

The object of my invention is to provide a harrow tooth of simple, durable and inexpensive construction yieldingly mounted upon a harrow frame.

More particularly my object is to provide in a harrow having transverse members, an improved tooth formed with a hollow bearing or hub mounted on such a transverse member, said hub carrying a coil spring which is secured to the hub and to the frame.

My invention consists in certain details in the construction, arrangement and combination of the various parts of the device, whereby the objects contemplated are attained as hereinafter more fully set forth, pointed out in my claim and illustrated in the accompanying drawing in which;

Figure 1 shows a rear elevation of one of the transverse members of a harrow frame having installed thereon harrow teeth embodying my invention. Fig. 2 shows a longitudinal, vertical, sectional view through a portion of said harrow and Fig. 3 shows a longitudinal, vertical, sectional view through the transverse harrow member shown in Fig. 1 and through one of my improved harrow teeth.

In the accompanying drawings, I have employed the reference numeral 10 to indicate generally the longitudinal frame members of a harrow. Connecting the members 10 are transverse members 11 preferably cylindrical in cross section. The members 11 may be made of gas pipe or the like.

My improved harrow teeth consist in each case of a tooth 12 and a hollow hub or bearing 13 formed at the upper end of the tooth. On the top of the bearing 13 is an upwardly extending lug 14. The hubs 13 receive the members 11 and on each member 11 is mounted a plurality of my improved teeth. The teeth are so arranged that when in their normal position they are inclined downwardly and forwardly from the transverse members 11. Adjacent to each end of each hub 13, bolts 15 are extended through openings in the transverse members 11. One end of each bolt 15 is screw threaded to receive a nut 16. The bolts 15 prevent longitudinal, sliding movement of the hubs 13 on the members 11. Extending from one end of each hub 13 is a lug 17 designed to engage the portions of the adjacent bolt 15 which extend beyond the transverse member 11, thereby permitting almost a half turn of the hub and tooth around the member 11.

For yieldingly holding each tooth in its downwardly and forwardly extending position illustrated in Fig. 2 and for exerting yielding pressure on the tooth to prevent its rearward movement, I have provided coil springs indicated generally by the reference character A. Each spring A comprises a horizontal portion 18, which rests in front of the lug 14 as shown in Fig. 1. Formed on each end of the horizontal portion 18 is a coil 19 wound around the hub 13. The free ends 20 of the coils 19 are secured to the bolts 15.

The lugs 17 are located near the lower part of the hub 13 and therefore, permit a comparatively slight upward and forward movement of the teeth 12, while permitting a considerable rearward movement of said teeth against the pressure of the spring A.

In the practical use of my improved harrow teeth, the teeth are installed on the harrow in substantially the position shown in Fig. 2 of my drawing herewith. When the harrow is drawn over the ground, if a projection such as a stump or a stone is encountered by the teeth, said teeth may be swung rearwardly until they are inclined downwardly and rearwardly from the transverse member 11. When in the latter position the teeth will readily ride over projections of the kind mentioned.

The advantages of my made harrow tooth may be largely seen from the foregoing description. It will be seen that when the teeth encounter a projection in the field, they are inclined rearwardly and permitted to ride over the projection instead of stopping the harrow with a jerk or breaking a tooth or some part of the harrow as might otherwise happen.

One of the objections to the ordinary spring tooth harrow, and other harrows of the type having teeth pivoted to swing in vertical planes, lies in the difficulty of mounting the teeth on the harrow frame in such a manner as to prevent the teeth from being bent or turned laterally. In other words, the difficulty lies in the fact that the teeth in the kinds of harrows mentioned are likely to be sprung or bent away from their proper positions in their relation with the other teeth of the harrow. The difficulty just mentioned is avoided by the use of my hub 13 which gives a broad bearing and prevents any lateral movement of the tooth on which the hub is formed.

It may be understood that some changes may be made in the details of the construction of my device without departing from its essential features, and it is my intention to cover by this application any such changes as may be included within the scope of the appended claim.

I claim as my invention:

In a device of the class described, the combination of a harrow frame having a transverse member cylindrical in cross section, with a harrow tooth having at its upper end a hollow cylindrical hub rotatably mounted on said transverse member, an upwardly extending lug formed on said hub, detachable means mounted in said transverse members for limiting the sliding movement of said hub on said transverse member, a lug formed on said hub and designed to engage said limiting means in different positions of the rotation of the said hub on said transverse member, a coil spring comprising a horizontal portion designed to engage the forward side of said lug, coils formed on each end of said horizontal portion, mounted on said hub, free ends of said coils being fixed with relation to said transverse member.

Des Moines, Iowa, July 15, 1913.

THOMAS J. GIBBONS

Witnesses:
 E. WILER,
 M. G. DEK.

---

Copies of this patent may be obtained for five cents each, by addressing the "Commissioner of Patents, Washington, D. C."